US011286787B2

(12) United States Patent
Lewis et al.

(10) Patent No.: US 11,286,787 B2
(45) Date of Patent: Mar. 29, 2022

(54) GAS TURBINE ENGINE AIRFOIL WITH SHOWERHEAD COOLING HOLES NEAR LEADING EDGE

(71) Applicant: United Technologies Corporation, Farmington, CT (US)

(72) Inventors: Scott D. Lewis, Vernon, CT (US); Dominic J. Mongillo, West Hartford, CT (US); Atul Kohli, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1648 days.

(21) Appl. No.: 15/266,855

(22) Filed: Sep. 15, 2016

(65) Prior Publication Data

US 2018/0073369 A1     Mar. 15, 2018

(51) Int. Cl.
*F01D 5/18*     (2006.01)
*F01D 25/12*    (2006.01)
(Continued)

(52) U.S. Cl.
CPC ............ *F01D 5/186* (2013.01); *F01D 5/187* (2013.01); *F01D 25/12* (2013.01); *F04D 29/582* (2013.01);
(Continued)

(58) Field of Classification Search
CPC . F01D 5/18; F01D 5/186; F01D 5/187; F01D 25/12; F01D 9/02; F01D 11/08;
(Continued)

(56) References Cited

U.S. PATENT DOCUMENTS 5,374,162 A * 12/1994 Green ..................... F01D 5/186
                                                     415/115
5,403,156 A    4/1995 Arness et al.
(Continued)

FOREIGN PATENT DOCUMENTS

EP       1691033        8/2006
EP       1691033 A1 *   8/2006   ............... B23H 9/10
(Continued)

OTHER PUBLICATIONS

Jabbari1992_Article_ThreeDimensionalFlowAtTheJunct (Year: 1992).*
(Continued)

*Primary Examiner* — Woody A Lee, Jr.
*Assistant Examiner* — Brian Christopher Delrue
(74) *Attorney, Agent, or Firm* — Carlson, Gaskey & Olds, P.C.

(57) ABSTRACT

An airfoil for a gas turbine engine includes pressure and suction side walls joined to one another at leading and trailing edges to provide an exterior airfoil surface. The pressure and suction side walls are spaced apart from one another in a thickness direction. A stagnation line is located near the leading edge. A cooling passage is provided between the pressure and suction side walls. The showerhead cooling holes are arranged at least one of adjacent to or on the stagnation line. At least one of the showerhead cooling holes has a metering hole fluidly connecting the cooling passage to a diffuser arranged at the exterior airfoil surface. At least one showerhead cooling hole is arranged on each of opposing sides of the stagnation line. Each showerhead cooling hole has the diffuser with a first diffuser angle that expands downstream in the thickness direction in opposing directions from one another when separated by the stagnation line.

3 Claims, 5 Drawing Sheets

(51) Int. Cl.
*F04D 29/58* (2006.01)
*F01D 9/02* (2006.01)
*F01D 11/08* (2006.01)
*F04D 29/08* (2006.01)
*F04D 29/32* (2006.01)
*F04D 29/54* (2006.01)

(52) U.S. Cl.
CPC .............. *F01D 9/02* (2013.01); *F01D 11/08* (2013.01); *F04D 29/083* (2013.01); *F04D 29/324* (2013.01); *F04D 29/542* (2013.01); *F05D 2220/32* (2013.01); *F05D 2240/303* (2013.01); *F05D 2250/38* (2013.01); *F05D 2260/201* (2013.01); *F05D 2260/202* (2013.01); *Y02T 50/60* (2013.01)

(58) Field of Classification Search
CPC ...... F04D 29/58; F04D 29/083; F04D 29/324; F04D 29/542; F05D 2240/303; F05D 2250/38; F05D 2260/201; F05D 2260/202; Y02T 50/676
See application file for complete search history.

(56) References Cited

U.S. PATENT DOCUMENTS

| | | | |
|---|---|---|---|
| 5,779,437 A * | 7/1998 | Abdel-Messeh | F01D 5/186 415/115 |
| 6,099,251 A | 8/2000 | LaFleur | |
| 6,164,912 A | 12/2000 | Tabbita et al. | |
| 6,210,112 B1 | 4/2001 | Tabbita et al. | |
| 7,563,073 B1 | 7/2009 | Liang | |
| 7,997,866 B2 | 8/2011 | Naik et al. | |
| 8,087,893 B1 * | 1/2012 | Liang | F01D 5/186 415/115 |
| 8,206,115 B2 * | 6/2012 | Gupta | F01D 5/143 415/211.2 |
| 8,777,571 B1 * | 7/2014 | Liang | F01D 5/187 416/97 R |
| 8,858,176 B1 * | 10/2014 | Liang | F01D 5/186 416/97 R |
| 9,228,440 B2 | 1/2016 | Kollati et al. | |
| 9,976,423 B2 * | 5/2018 | Quach | F01D 5/186 |
| 2005/0079060 A1 * | 4/2005 | MacManus | F01D 5/141 416/235 |
| 2009/0162204 A1 * | 6/2009 | Aggarwala | F01D 5/141 416/204 R |
| 2009/0317227 A1 * | 12/2009 | Grover | F01D 5/141 415/1 |
| 2010/0040478 A1 * | 2/2010 | Abdel-Messeh | F01D 5/187 416/97 R |
| 2016/0010463 A1 * | 1/2016 | Quach | F01D 5/186 60/806 |
| 2016/0076451 A1 | 3/2016 | McBrien et al. | |
| 2016/0177734 A1 * | 6/2016 | Quach | F01D 5/186 416/1 |

FOREIGN PATENT DOCUMENTS

| | | | |
|---|---|---|---|
| WO | 9819049 | 5/1998 | |
| WO | WO-9819049 A1 * | 5/1998 | ............ F01D 5/186 |
| WO | 2014114988 | 7/2014 | |
| WO | WO-2014137686 A1 * | 9/2014 | ............ F01D 5/186 |

OTHER PUBLICATIONS

Stagnation Region Gas Film Cooling for Turbine Blade Leading-Edge Applications (Year: 1977).*
Design and Validation of a High-Lift Low-Pressure Turbine Blade (Year: 2007).*
European Search Report for European Application No. 17191316.3 dated Dec. 15, 2017.
European Search Report for European Application No. 19205738.8 dated Jan. 13, 2020.

* cited by examiner

GAS TURBINE ENGINE AIRFOIL WITH SHOWERHEAD COOLING HOLES NEAR LEADING EDGE

BACKGROUND

This disclosure relates to a gas turbine engine airfoil. More particularly, the disclosure relates to a cooling configuration in a stagnation zone of, for example, a turbine section airfoil.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

As the demand for gas turbine thrust and efficiency increases, the rotor inlet temperatures into the turbine increases. The airfoils which extract work from the combustion gases require cooling to prevent damage. Many blades and vanes, blade outer air seals, turbine platforms, and other components include internal cooling passages that communicate cooling fluid to exterior surfaces through cooling holes to reduce surface temperatures.

The leading edge of a turbine blade or vane is an area of very high heat load. The hot combustion gases impinge on the leading edge airfoil which results in a very high heat transfer coefficient causing the blade or vane to heat up considerably. To prevent the blade or vane from melting or oxidizing prematurely, cooling is required both internally and also via film cooling. Film cooling occurs when coolant exits the blade or vane via a hole and then rides on the downstream surface and provides a thermal film barrier to the hot combustion gases. Diffused film cooling holes provide better cooling performance than round film cooling holes and the diffuser slows down the coolant. Efficient blade and vane designs utilize strategically placed cooling holes to cool the leading edge of the airfoil with a minimum amount of cooling air.

SUMMARY

In one exemplary embodiment, an airfoil for a gas turbine engine includes pressure and suction side walls joined to one another at leading and trailing edges to provide an exterior airfoil surface. The pressure and suction side walls are spaced apart from one another in a thickness direction. A stagnation line is located near the leading edge. A cooling passage is provided between the pressure and suction side walls. The showerhead cooling holes are arranged at least one of adjacent to or on the stagnation line. At least one of the showerhead cooling holes has a metering hole fluidly connecting the cooling passage to a diffuser arranged at the exterior airfoil surface. At least one showerhead cooling hole is arranged on each of opposing sides of the stagnation line. Each of the at least one showerhead cooling holes has the diffuser with a first diffuser angle that expands downstream in the thickness direction in opposing directions from one another when separated by the stagnation line.

In a further embodiment of any of the above, the diffuser has a first diffuser angle that is 5°-20° from a centerline of the metering hole and expands downstream in the thickness direction.

In a further embodiment of any of the above, the first diffuser angle is 7°-16°.

In a further embodiment of any of the above, the first diffuser angle is 8°-12°.

In a further embodiment of any of the above, the diffuser includes a first diffuser surface that expands from the metering hole to the exterior airfoil surface at the first diffuser angle.

In a further embodiment of any of the above, the first diffuser surface that is planar from the metering hole to the exterior airfoil surface.

In a further embodiment of any of the above, the diffuser includes a second diffuser angle that is 0°-5° from the centerline and expands in a radially outward direction.

In a further embodiment of any of the above, the second diffuser angle is 2°.

In a further embodiment of any of the above, diffuser includes a second diffuser surface that expands from the metering hole to the exterior airfoil surface at the second diffuser angle. The second diffuser surface is planar from the metering hole to the exterior airfoil surface.

In a further embodiment of any of the above, the diffuser includes a third diffuser angle that is 5°-20° from the centerline and expands in a radially inward direction.

In a further embodiment of any of the above, the third diffuser angle is 13°-17°.

In a further embodiment of any of the above, diffuser includes a third diffuser surface that expands from the metering hole to the exterior airfoil surface at the third diffuser angle. The third diffuser surface is planar from the metering hole to the exterior airfoil surface.

In a further embodiment of any of the above, the diffuser includes a second diffuser angle that is 0°-5 ° from the centerline and expands in a radially outward direction. The diffuser includes a third diffuser angle that is 5°-20° from the centerline and expands in a radially inward direction.

In a further embodiment of any of the above, the diffuser provides a quadrangular opening in the exterior airfoil surface.

In a further embodiment of any of the above, the diffuser includes a fourth diffuser angle that is 0°-5° to the centerline and is adjacent to the stagnation line.

In a further embodiment of any of the above, a single metering hole is configured to feed the diffuser with a cooling fluid.

In one exemplary embodiment, an airfoil for a gas turbine engine includes pressure and suction side walls joined to one another at leading and trailing edges to provide an exterior airfoil surface, the pressure and suction side walls spaced apart from one another in a thickness direction, a stagnation line located near the leading edge, a cooling passage provided between the pressure and suction side walls, and showerhead cooling holes arranged at least one of adjacent to or on the stagnation line, at least one of the showerhead cooling holes has a metering hole fluidly connecting the cooling passage to a diffuser arranged at the exterior airfoil surface, the diffuser has a first diffuser angle that is from a centerline of the metering hole and expands downstream in the thickness direction, a second diffuser angle that is from the centerline and expands in a radially outward direction, a third diffuser angle that is 5°-20° from the centerline and expands in a radially inward direction, and a single metering hole is configured to feed the diffuser with a cooling fluid.

In a further embodiment of any of the above, the first diffuser angle is 5°-20°.

In a further embodiment of any of the above, the second diffuser angle is 0°-5°.

In a further embodiment of any of the above, at least one showerhead cooling hole is arranged on each of opposing sides of the stagnation line, wherein each of the at least one showerhead cooling holes has the diffuser with the first diffuser angle that expands downstream in the thickness direction in opposing directions from one another when separated by the stagnation line.

BRIEF DESCRIPTION OF THE DRAWINGS

The disclosure can be further understood by reference to the following detailed description when considered in connection with the accompanying drawings wherein.

DETAILED DESCRIPTION

Figure 1:
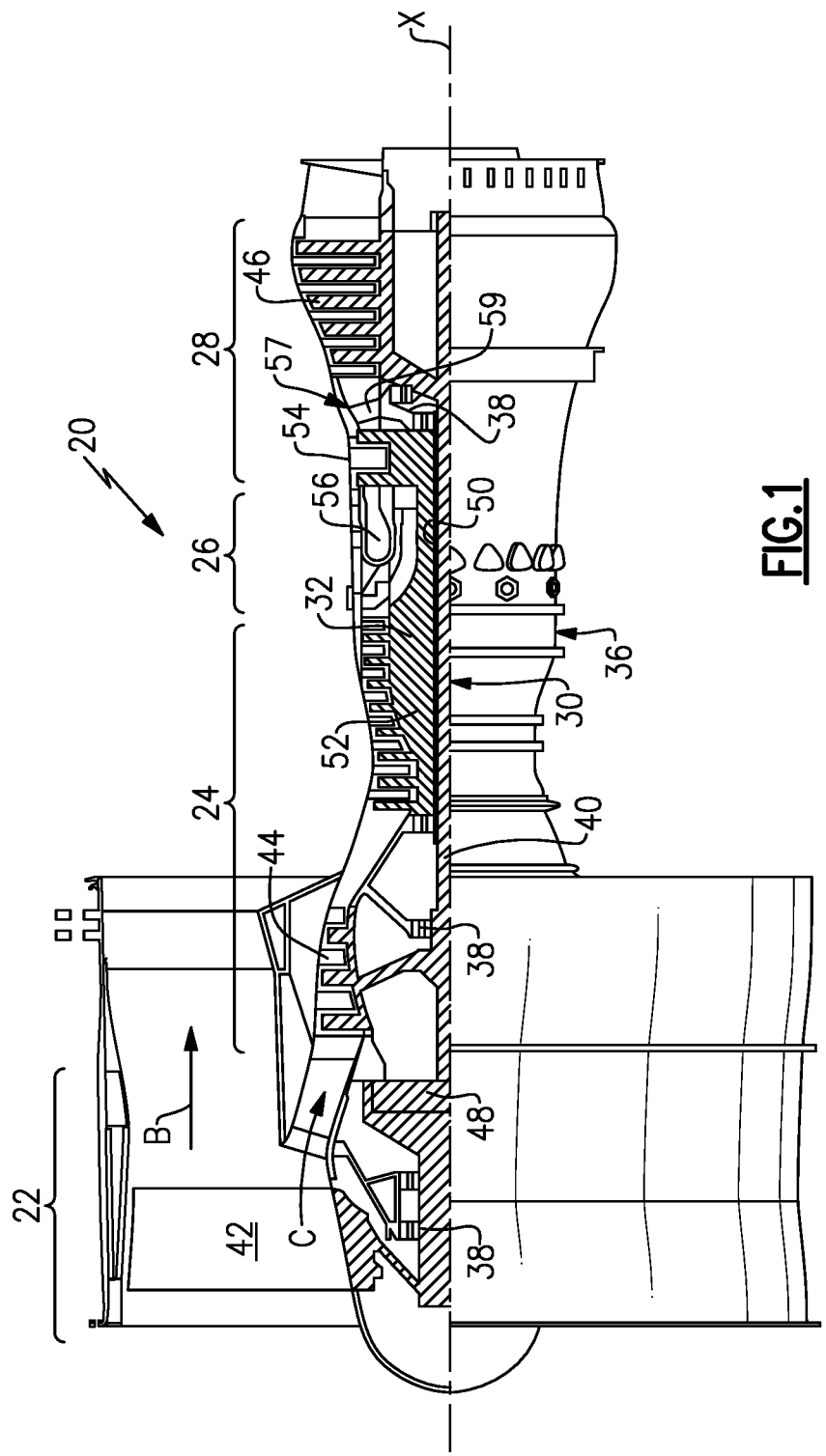
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram° R)/(518.7° R)]^{0.5}$. The "Low corrected fan tip speed", as disclosed herein according to one non-limiting embodiment, is less than about 1150 ft/second.

The disclosed cooling holes may be used in various gas turbine engine components. For exemplary purposes, a turbine blade 64 is described. It should be understood that the cooling passage may also be used in vanes, blade outer air seals, and turbine platforms, for example. Additionally, although the airfoil is shown as part of the turbine section 28, the airfoil can also be used in the compressor section 24, if desired.

Figure 2A:
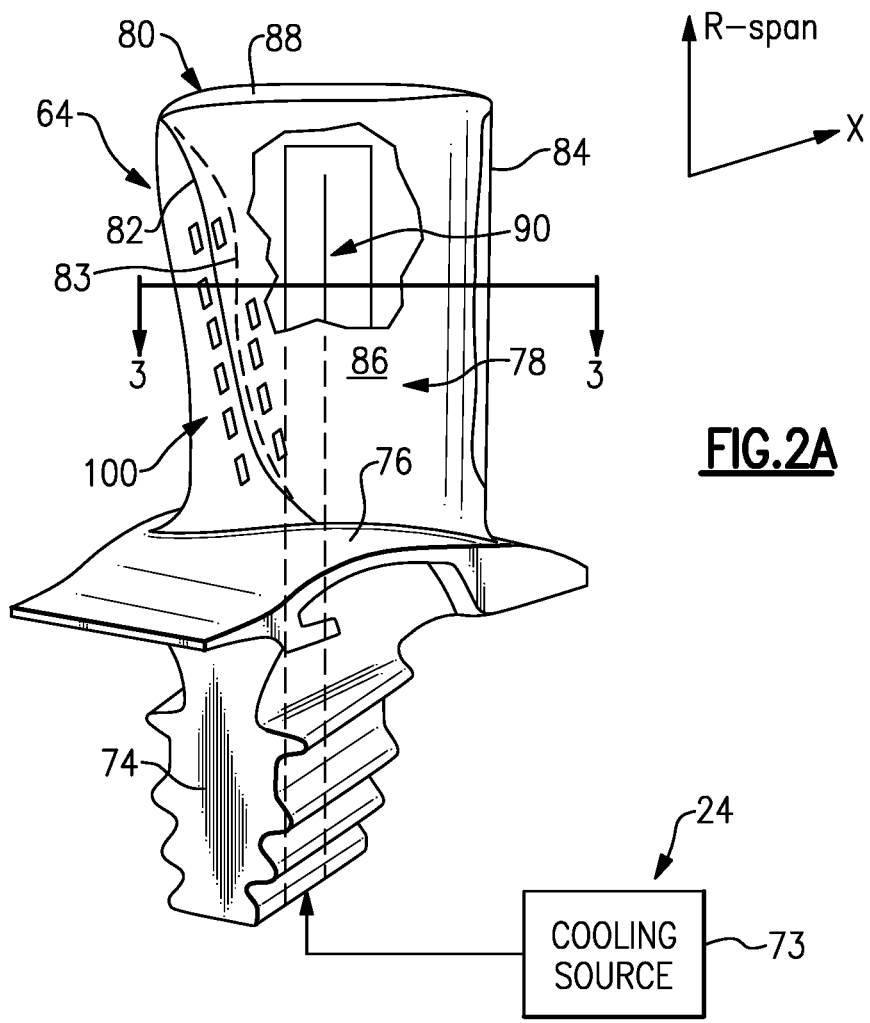
FIG. 2A is a perspective view of a blade having a cooling passage and the disclosed cooling holes.
Figure 2B:
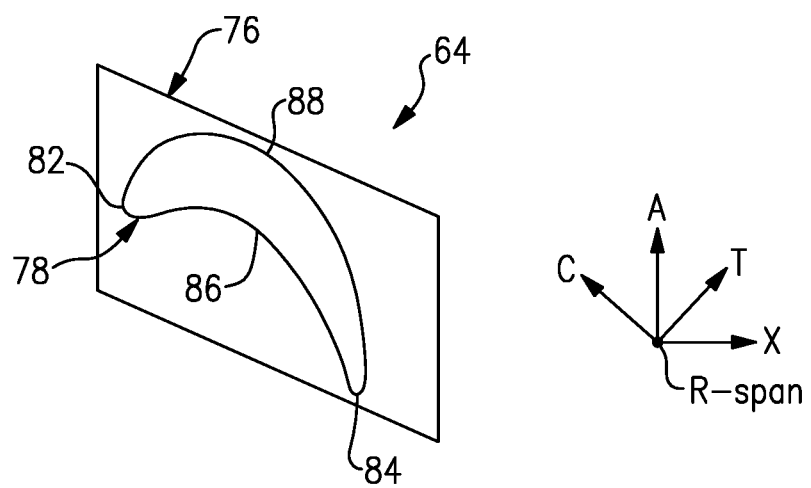
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates an exterior airfoil surface 68 extending in a chord-wise direction C from a leading edge 82 to a trailing edge 84. The airfoil 78 is provided between pressure (substantially concave) and suction (substantially convex) walls 86, 88 in an airfoil thickness direction T, which is generally perpendicular to the chord-wise direction C and corresponds to the leeward direction and/or favorable pressure gradient direction. A circumferential array of multiple turbine blades 64 are in a circumferential direction A. The airfoil 78 extends from the platform 76 in the radial direction R, or spanwise, to the tip 80.

Figure 3:
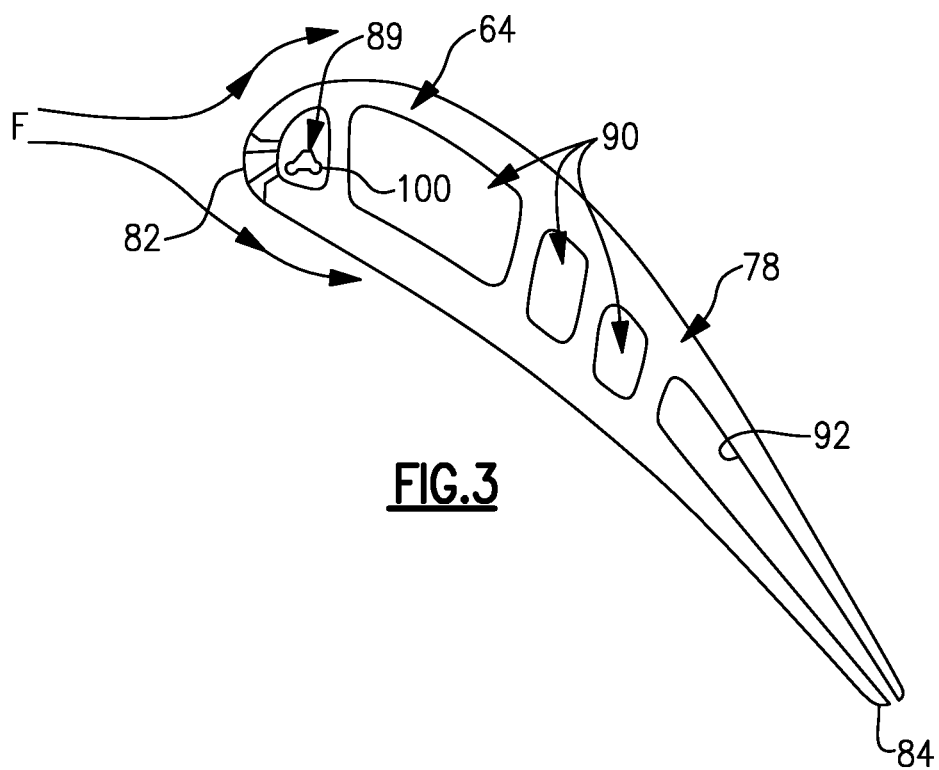
FIG. 3 is a cross-sectional view of the airfoil taken along line 3-3 in FIG. 2A.

Referring to FIGS. 2A and 3, the airfoil 78 includes a leading edge cooling passage 89, a serpentine cooling passage 90 and a trailing edge cooling passage 92 that extends to the trailing edge 84. The cooling passages 89, 90, 92 are provided between the pressure and suction walls 86, 88. The exterior airfoil surface 68 may include multiple film cooling holes (not shown) in fluid communication with the cooling passages. For example, showerhead cooling holes 100 are in fluid communication with the leading edge cooling passage 89 and are clustered about the leading edge 82.

Figure 4:
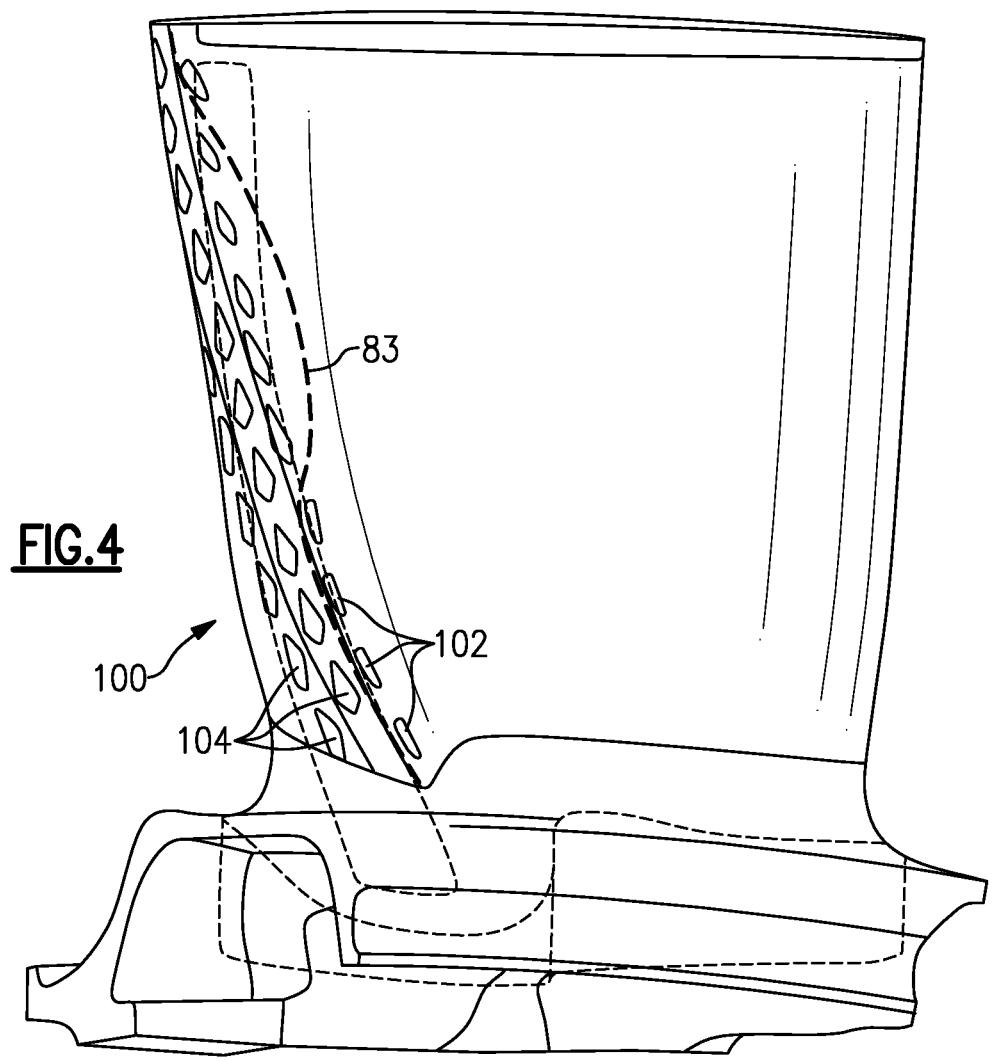
FIG. 4 is a perspective view of the blade shown in FIG. 2A with one of the cooling passages and showerhead cooling holes shown in phantom.

A high lift turbine blade 64 is illustrated in more detail in FIG. 4. The streamlines are indicated by the double-arrowed lines in FIG. 3. In one example, a high lift airfoil is defined as an airfoil with a Zweifel lift coefficient greater than 1.1. The Zweifel lift coefficient is the ratio of actual airfoil load to ideal airfoil load, as set forth in U.S. Pat. No. 7,581,930, which is incorporated by reference in its entirety. The showerhead cooling passages 100 can be used on other types of airfoils.

A stagnation line on an airfoil is where the airfoil surface Mach number is essentially zero, meaning the static and total pressure are the same. In the example high lift design, the stagnation line 83 shifts from the airfoil nose to the pressure side in the 50% span to 95% span region on the pressure side wall 86 aft of the leading edge 82, as shown in FIGS. 2 and 4.

The showerhead cooling holes 100 are arranged adjacent to and/or on, i.e, coincident with, the stagnation line 83. In the example configuration, the showerhead cooling holes 100 include clusters of shower head cooling holes 102, 104 respectively arranged on the pressure and suction sides of the stagnation line 83. The showerhead cooling holes 100 have a metering hole 106 fluidly connecting the leading edge cooling passage 89 to a diffuser 110 that is arranged at the exterior airfoil surface 68. In the examples shown, only one metering hole 106 feeds each diffuser 110.

It should be understood that the metering hole 106 may be of various geometric shapes that include but are not limited to, cylindrical, elliptical, oval, geometric shapes. Additionally, the metering hole 106 can also comprise of an upper and/or lower concave or convex surface to improve film effectiveness characteristics.

Similarly, the diffuser 110 may be of various geometric shapes that include but are not limited to multi-faceted, planar surfaces, concave, convex, curvilinear, and/or single or multi-lobe geometric shapes. It is also recognized that each of the diffuser surfaces may be of unique geometric shapes in order to maximize film cooling performance, geometric coverage, area ratio, and reduced film vorticity to reduce penetration and entrainment of hot freestream gas.

Figures 4A, 4B:
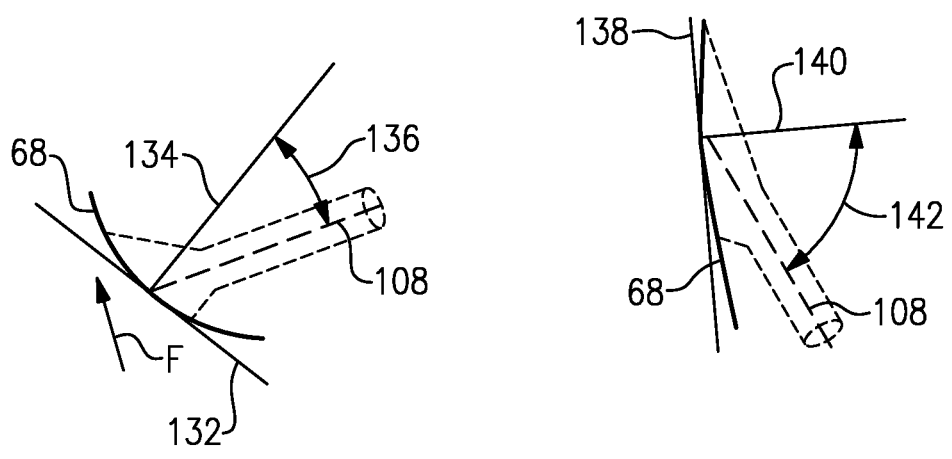
FIG. 4A is a schematic view of a centerline of a metering hole of the showerhead cooling holes with respect to airfoil reference features.
FIG. 4B is another schematic view of a centerline of a metering hole of the showerhead cooling holes with respect to airfoil reference features.

Each metering hole has a centerline 108. Referring to FIGS. 4A and 4B, the centerline 108 is located relative to various reference features a desired angle. Referring to FIG. 4A, which is viewed generally in the radial direction, the centerline 108 breaks the exterior airfoil surface 68 at a point. A line 134 is arranged normal to a line 132 tangent to the exterior airfoil surface 68 at the tangent point. The centerline 108 is arranged at a first metering hole angle 136 from the normal line 134, which is 0°+/−80°. It is desirable to pack the cooling holes very close together on the external surface of the airfoil, and angles nearest 0° provide the closest packing. Referring to FIG. 4B, which is viewed generally in the thickness direction, the centerline 108 breaks the exterior airfoil surface 68 at the same point shown in FIG. 4A. A line 140 is arranged normal to a line 138 tangent to the exterior airfoil surface 68 at the tangent point. The centerline 108 is arranged at a second metering hole angle 142 from the normal line 140, which is −5° to −80° or 5° to 80°, for example. One typical second metering hole angle 142 is approximately 70°.

Figure 6A:
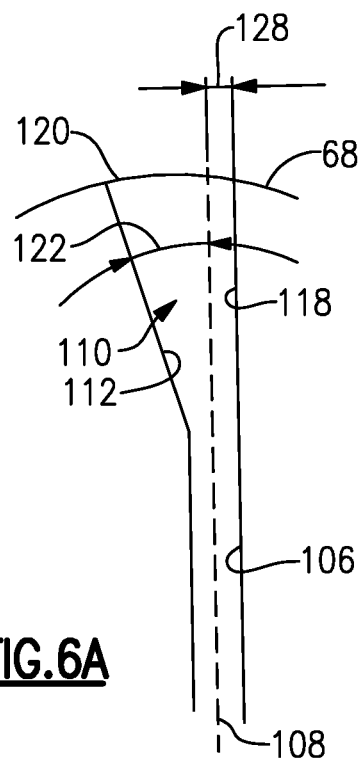
FIG. 6A depicts a diffuser of the showerhead cooling holes schematically in cross-section when viewed from a first direction.
Figure 6B:
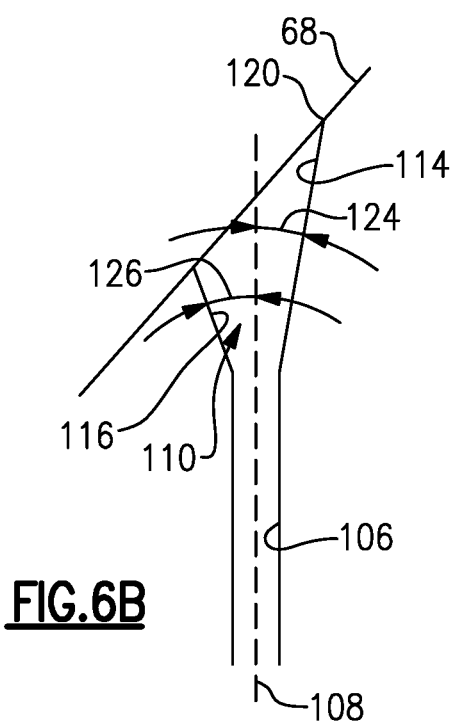
FIG. 6B depicts a diffuser of the showerhead cooling holes schematically in cross-section when viewed from a second direction.
Figure 5A:
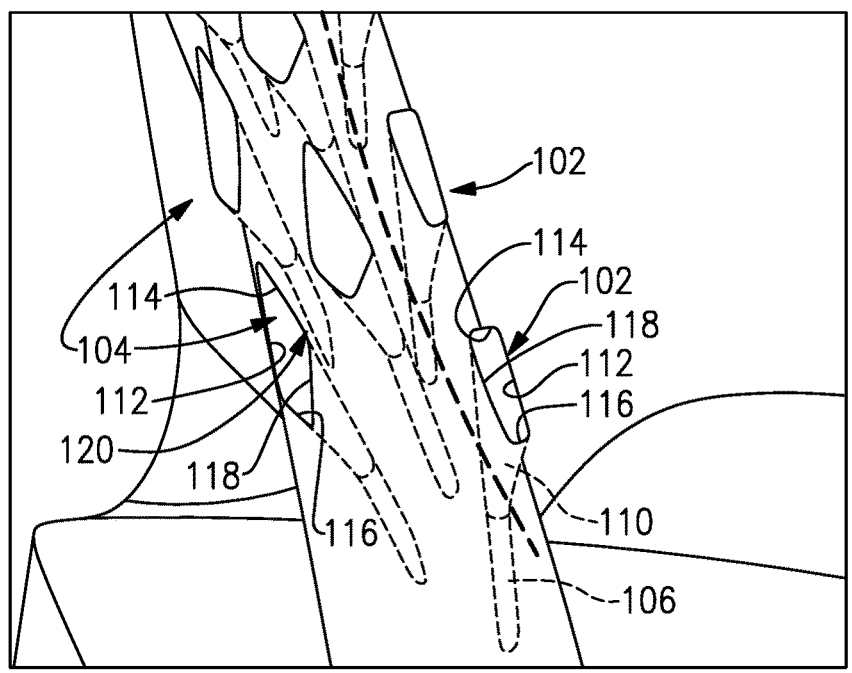
FIGS. 5A and 5B illustrate enlarged perspective views of the showerhead cooling holes illustrated in FIG. 4 on radially inward and radially outward portions of the airfoil, respectively.
Figure 5B:
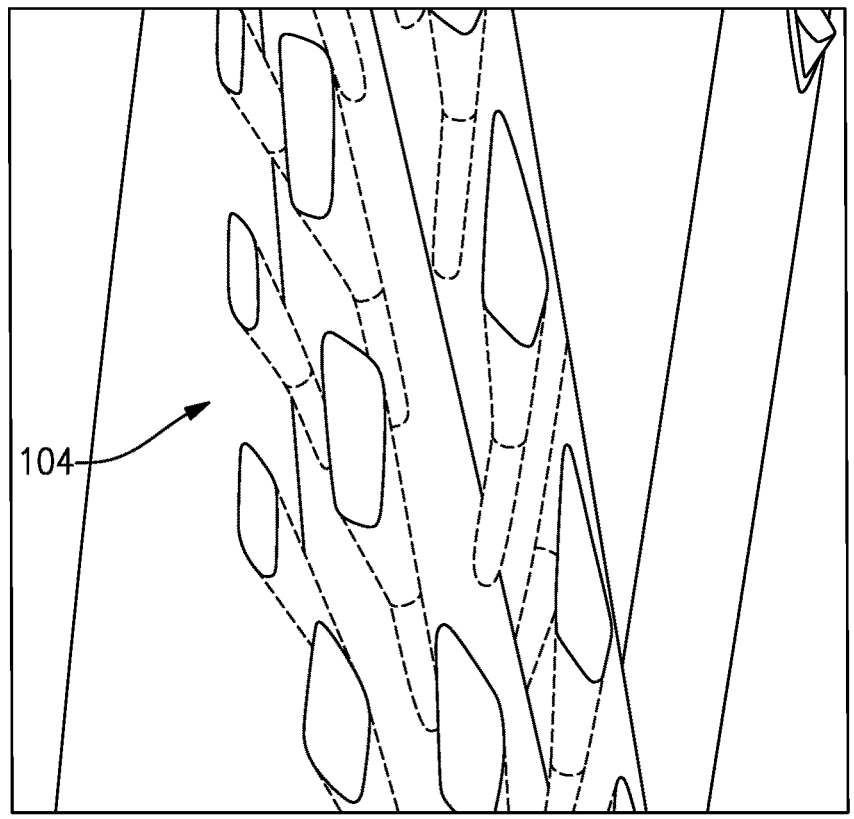

In the example, best shown in FIGS. 5A, 5B and 6, the diffuser 110 terminates in an opening 120 provided in the exterior airfoil surface 68. The opening 120 is generally quadrangular in one illustrated example. The diffuser 110 is provided by first, second, third, and fourth diffuser surfaces 112, 114, 116, 118. Each of the first, second, third and fourth diffuser surfaces 112, 114, 116, 118 are provided respectively at first, second, third and fourth diffuser angles 122, 124, 126, 128 arranged relative to the centerline 108. The first diffuser angle 122 is 5°-20° from the centerline 108 and extends downstream in the thickness direction T. In one example, the first diffuser angle 122 is 7°-16°, and in another example, the diffuser angle is 8°-12°.

The first diffuser surface 112 extends from the metering hole 106 to the exterior airfoil surface 68 at the first diffuser angle 122. The first diffuser surface 112 is planar from the metering hole 106 to the exterior airfoil surface 68, that is, the first diffuser surface is not provided by multiple diffuser angles.

The second diffuser angle 124 is 0°-5° from the centerline 108 and extends in a radially outward direction. In one example, the second diffuser angle 124 is 2°. The second diffuser surface 114 is planar from the metering hole 106 to the exterior airfoil surface 68. The third diffuser angle 126 is 5°-20° from the centerline 108 and extends in a radially inward direction. In one example, the third diffuser angle 126 is 10°-20°, and in another example is 15°. The third diffuser surface 116 is planar from the metering hole 106 to the exterior airfoil surface 68.

As best shown in FIGS. 4 and 5A, at least one showerhead cooling hole is arranged on each of opposing sides of the stagnation line 83 such that the metering holes and respective diffusers extend downstream in the thickness direction in opposing directions from one another when separated by the stagnation line 83, which can also be seen in FIG. 3.

The fourth diffuser angle 128 is 0°-5°, and in one example is parallel to, that is, 0° to, the centerline 108. The fourth diffuser angle 128 is arranged adjacent to the stagnation line, whereas the first diffuser surface 112 is arranged on a side opposite the fourth diffuser surface 118.

Each side of the diffuser, is optimized based on local leading edge airfoil geometry, radius of curvature and stagnation line location. Additionally, diffuser angles, shapes, area ratios, and relative orientation are tailored to local leading edge airfoil streamlines, pressure gradients, and cooling hole mass flux blowing and momentum flux ratios. The metering hole geometry and film hole centerlines are configured at specific angles and orientations in order to maximize hole-to-hole conduction lengths, cooling hole area ratios, and lateral expansion to achieve maximize film cooling effectiveness and thermal performance The more efficient showerhead film cooling hole geometry design requires less cooling flow than prior art configurations.

The disclosure diffusion angles were validated via computational fluid dynamic analysis. Improved film cooling hole performance lowers the metal temperature of the blade or vane and better achieved target metal temperature over current showerhead cooling hole configurations.

The disclosed airfoil may be manufactured, and its cooling passages and/or holes formed, using, for example, electrical discharge machining (EDM), high speed EDM, laser ablation, water jet-laser assist hole drill processes, as well as, advanced manufacturing, such as direct metal laser sintering (DMLS)/electron beam machining (EBM), additive manufacturing, fugitive core, and conventional investment casting processes.

Although the different examples have specific components shown in the illustrations, embodiments of this invention are not limited to those particular combinations. It is possible to use some of the components or features from one of the examples in combination with features or components from another one of the examples.

Furthermore, although an example embodiment has been disclosed, a worker of ordinary skill in this art would recognize that certain modifications would come within the scope of the claims. For that reason, the following claims should be studied to determine their true scope and content.

What is claimed is:

1. An airfoil for a gas turbine engine comprising:
pressure and suction side walls joined to one another at leading and trailing edges to provide an exterior airfoil surface, the pressure and suction side walls spaced apart from one another in a thickness direction, a stagnation line located near the leading edge, a cooling passage provided between the pressure and suction side walls, and showerhead cooling holes arranged at least one of adjacent to or on the stagnation line, at least one of the showerhead cooling holes has a metering hole fluidly connecting the cooling passage to a diffuser arranged at the exterior airfoil surface, the diffuser has a first diffuser angle that is from a centerline of the metering hole and expands downstream in the thickness direction, a second diffuser angle that is from the centerline and expands in a radially outward direction, a third diffuser angle that is 5°-20° from the centerline and expands in a radially inward direction, and a single metering hole is configured to feed the diffuser with a cooling fluid, wherein the airfoil has a Zweifel lift coefficient of greater than 1.1, and the stagnation line shifts from the leading edge to the pressure side wall in the 60% span to the 95% span region on the pressure side wall aft of the leading edge.

2. The airfoil according to claim 1, wherein the first diffuser angle is 5°-20°.

3. The airfoil according to claim 1, wherein at least one showerhead cooling hole is arranged on each of opposing sides of the stagnation line, wherein each of the at least one showerhead cooling holes has the diffuser with the first diffuser angle that expands downstream in the thickness direction in opposing directions from one another when separated by the stagnation line.

* * * * *